(12) United States Patent
Jones

(10) Patent No.: US 6,240,880 B1
(45) Date of Patent: Jun. 5, 2001

(54) TRAINING DEVICE FOR PETS

(76) Inventor: Timothy Alfred Jones, 51 Lake Forest Cir., Lake St. Louis, MO (US) 63367

( * ) Notice: Subject to any disclaimer, the term of this patent is extended or adjusted under 35 U.S.C. 154(b) by 0 days.

(21) Appl. No.: 08/754,293

(22) Filed: Nov. 20, 1996

(51) Int. Cl.$^7$ ................................................ A01K 37/00
(52) U.S. Cl. ................................................ 119/712
(58) Field of Search ................................ 119/174, 526, 119/28.5, 712; 340/665, 666, 340, 626, 692, 693

(56) References Cited

U.S. PATENT DOCUMENTS

| | | | |
|---|---|---|---|
| 3,874,341 | * 4/1975 | Riba | 119/51.12 |
| 4,551,713 | * 11/1985 | Aossey | 340/666 X |
| 4,780,706 | * 10/1988 | Bollag | 340/666 |
| 4,830,461 | * 5/1989 | Ishiharada et al. | 350/96.29 |
| 4,969,418 | * 11/1990 | Jones | 119/29 |
| 5,210,528 | * 5/1993 | Schulman et al. | 340/666 |
| 5,264,824 | * 11/1993 | Hour | 340/384 |
| 5,546,075 | * 8/1996 | Shimoji | 340/666 |

* cited by examiner

*Primary Examiner*—Thomas Price

(57) ABSTRACT

A training device to speed up and give positive feedback to the process of housebreaking a pet, including, but not limited to dogs, cats, house pigs, and any normal pet that is capable of being housebroken. The training device includes case, a power supply, and a hinge product to allow for the moving of the pet operated paddle/lever with a minimum resistance, a mast for the purpose of mounting the paddle/lever, a switch, and an output device, such as a buzzer, capable of emitting an audible noise, from an electrical source. The training device would be placed by the exit of your home that would be the normal exit that you would use to facilitate letting your pet out for body function waste release. The training device would have a lever or paddle that the pet would be trained to depress or otherwise cause to be operated when the need to go outside would come about. The device would be so configured by packaging to rest on the floor in a freestanding position. The buzzer, or output device would signal the trainer or owner that the pet was requesting attention for the request.

10 Claims, 5 Drawing Sheets

Note: Drawings not to scale

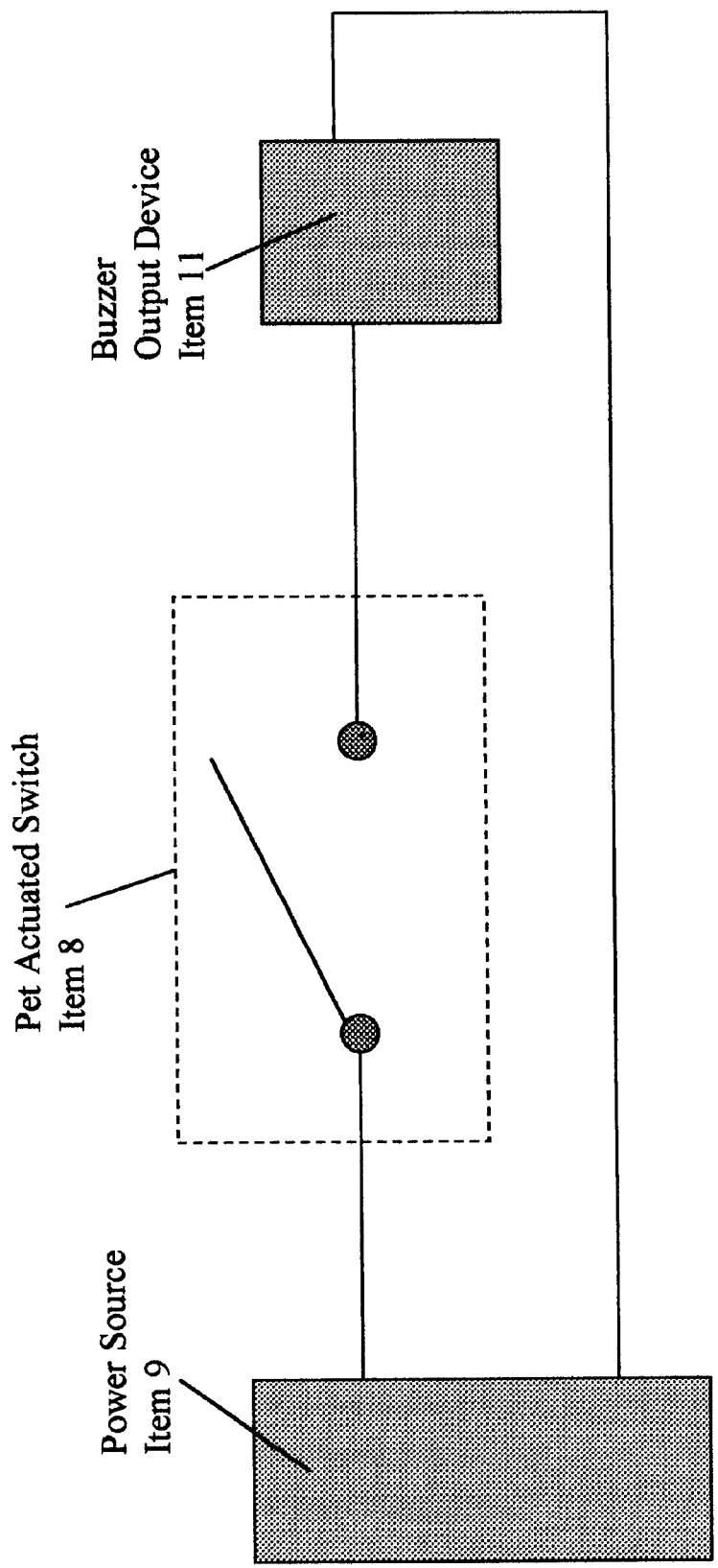

TRAINING DEVICE FOR PETS

CROSS REFERENCE TO RELATED APPLICATION

None found

STATEMENT AS TO RIGHTS TO INVENTIONS MADE UNDER FEDERALLY-SPONSORED APPLICATIONS

None

1. Field of the invention

Figure 1:
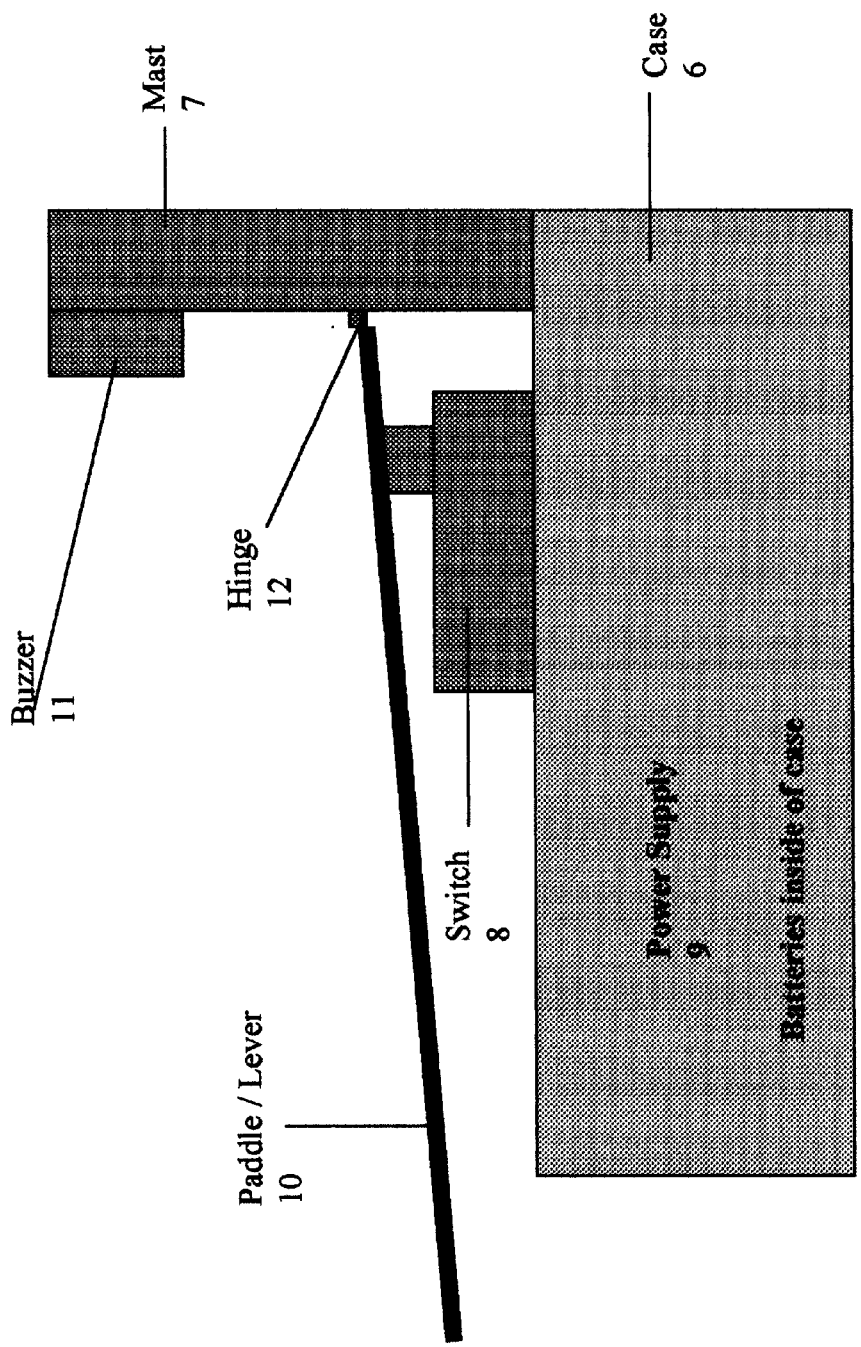

The field of this invention is in class 119 animal husbandry and more specifically to sub class 905 prior art, the breaking and training of animals.

2. Description of Prior Art

A search of the prior art listing for the above mentioned sub class 905 breaking or training, reflected no similarities to any existing patents. The present invention relates generally to the housebreaking of domestic pets and more particularly to providing a method to train house pets by allowing them to activate the training device to provide an audible signal to call the attention of the owner or trainer to the need to let the pet outside.

SUMMARY OF THE INVENTION

The present invention relates generally to the housebreaking of pets and more particularly to a new device designed for the purpose of teaching the pet to actuate a training device to signal the need to be let outside. In the proper care of domestic pets, such as dogs and cats and other animals it is necessary to have a method to train the pet to become housebroken. Many such methods have been used throughout the years but most of them utilize a punishment technique that teaches by negative reinforcement. The pet is punished after having an accident in the house. The present invention allows the owner or trainer to use positive reinforcement and to provide a method that is easily learned and the training can be carried out by even the youngest of pet owners. The present invention will provide the trainer with a specific procedure to accomplish the needed training in the housebreaking process. The training device will also have a residual value after the training device has been used to accomplish the housebreaking in that it will be able to continue to be used as a signaling device to the trainer that the pet is requesting to be let outside. The training device will further provide an audible signal that can be heard from locations that your vision may be blocked from. The training device, when actuated by the pet by (item 10) paddle/switch mounted to (item 7) mast by (item 12) hinge material will close a circuit through (item 8) switch, and allow voltage from (item 9) power supply to actuate the (item 11) buzzer and give out an audible signal. All of these items will be mounted in (item 6) case. These and other information will be readily evident upon review of the enclosed drawings including FIG. 1, FIG. 2, FIG. 3, FIG. 4, and FIG. 5.

The drawing figures that will be used in the attached drawings are as follows,

FIG. 1 drawing
FIG. 2 drawing
FIG. 3 drawing
FIG. 4 drawing
FIG. 5 drawing
item 6 case
item 7 mast
item 8 switch
item 9 power supply
item 10 paddle/lever
item 11 buzzer
item 12 hinge material There are five drawings that reflect the assembly of the pet training device, listed as follows.

FIG. 1 A drawing of the training device side view showing a right side view showing all components listed as items, 6,7,8,9,10,11, and 12.

Figure 2:
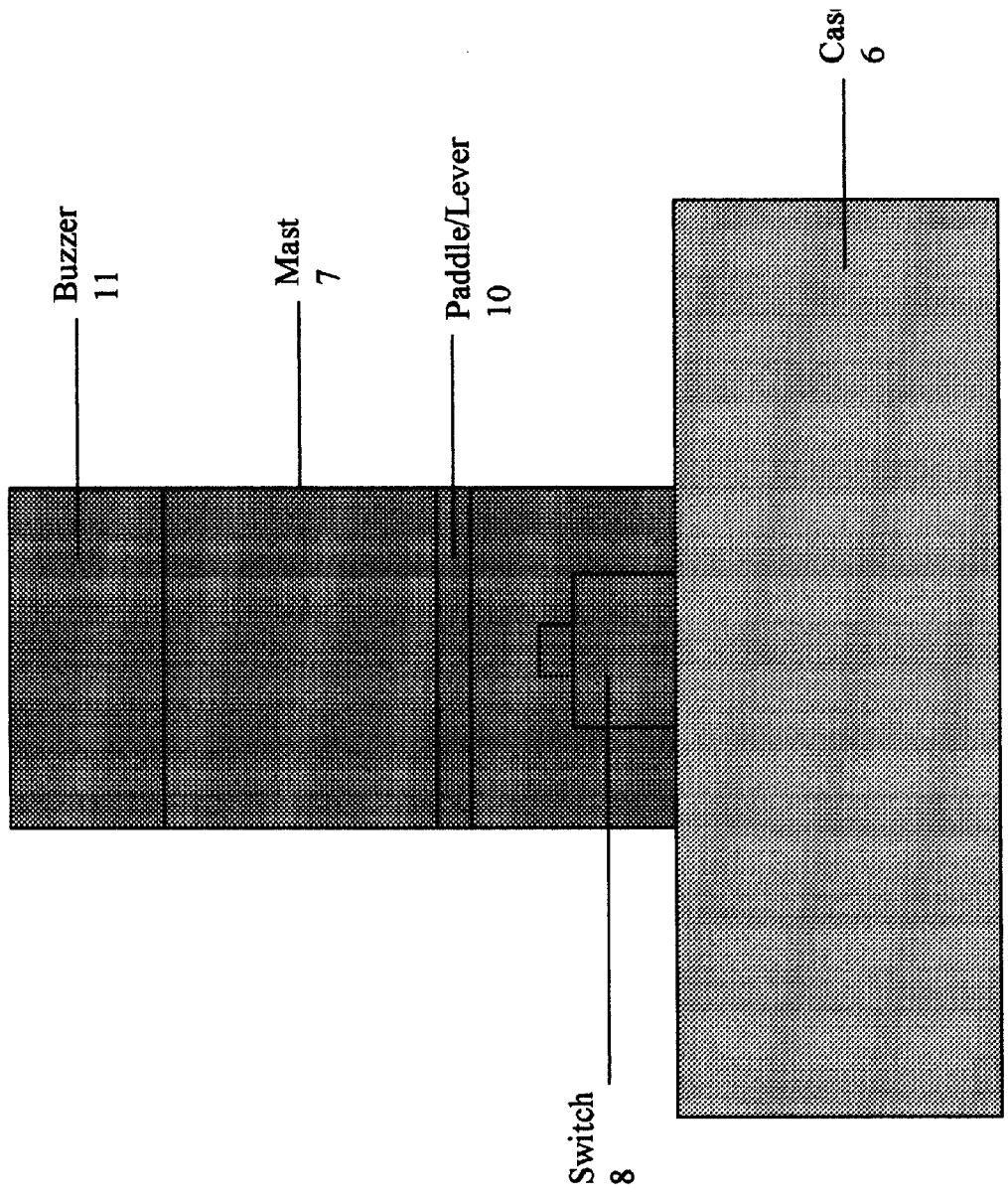

FIG. 2 An end view of the training device from the end that the pet would be during usage. This view shows case (item 6), switch (item 8) paddle/lever (item 10), mast (item 7) and buzzer (item 11).

Figure 3:
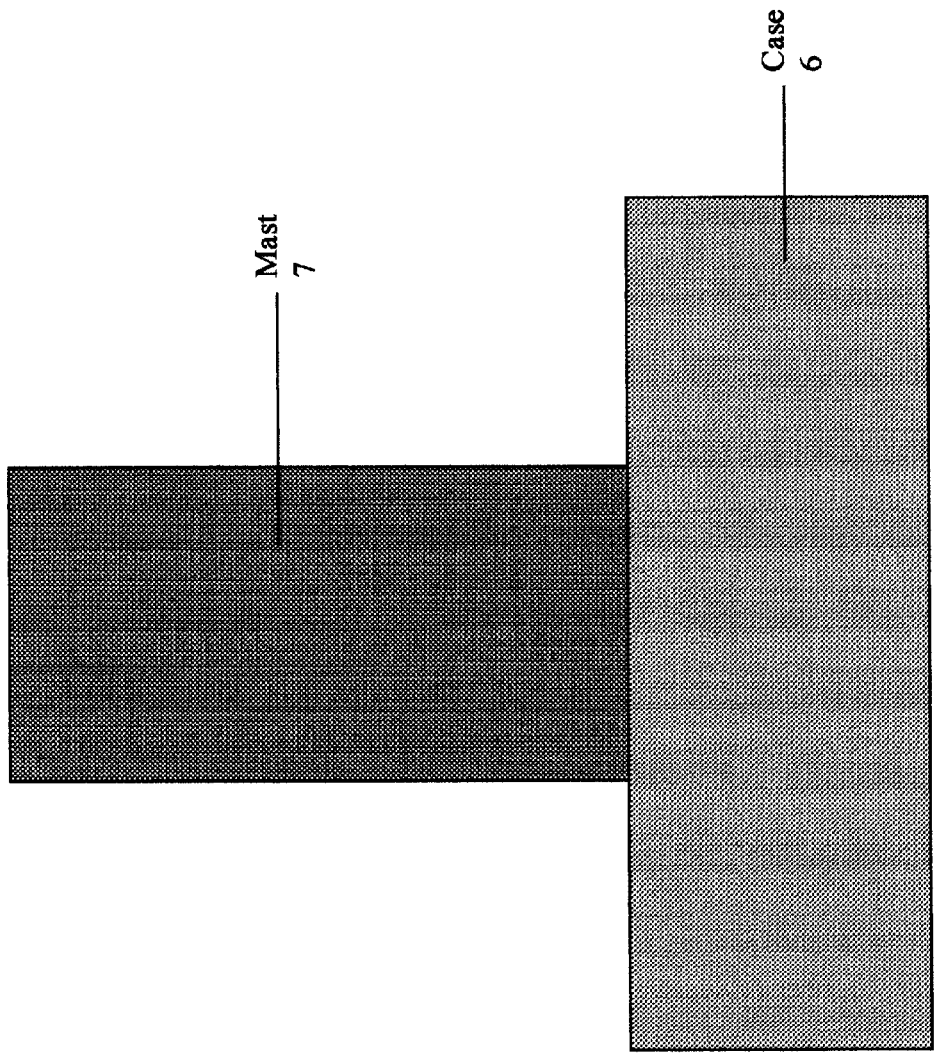

FIG. 3 An end view opposite the pet end. This figure shows mast (item 7) and case (item 6).

Figure 4:
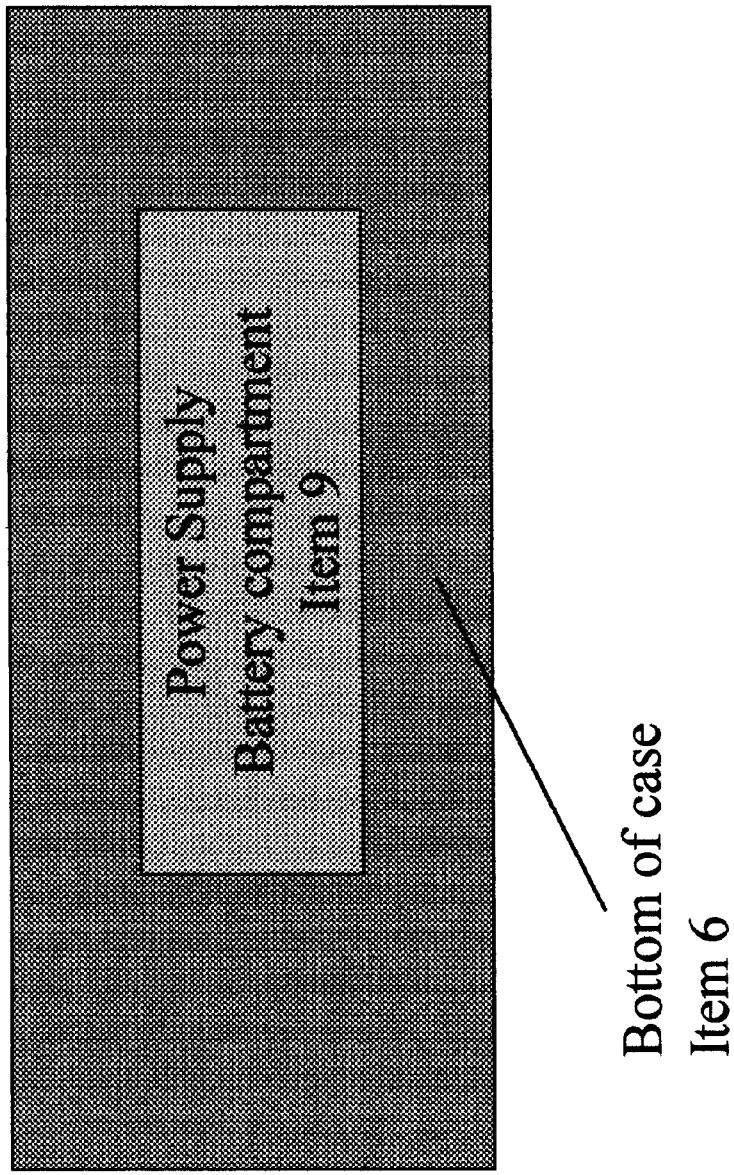

FIG. 4 A bottom view showing power supply (item 9) compartment.

FIG. 5 This drawing reflects the one-line electrical diagram. Shown here are power supply (item 9) switch (item 8) and buzzer (item 11).

DESCRIPTION OF THE TRAINING DEVICE WOULD BE AS FOLLOWS

The training device (FIG. 1) is a small, portable, pet activated, signaling device that is free standing in nature and could conveniently be placed near the door that would be used to let the pet out. It has a paddle or lever operator (item 10) that the pet can actuate. The pet would be trained by touching the paw or foot to the paddle (item 10) and after the audible signal responds from buzzer (item 11), a command would be issued that would allow the pet to recognize the deed with the need. Outside, would be one command that could be used. After the command, the pet should immediately be taken out and allowed some time to do his business. Praise and treat should follow and this will greatly enhance the learning curve for the pet to associate the need with the deed.

CONCLUSION

The training device for pets (FIG. 1), is a device to be used in a planned procedure for the housebreaking of pets. The training device (FIG. 1) extends to the pet, the ability to tell the trainer specifically what the request is for. The device has an ongoing value after the training has been accomplished as it can continue to be used by the pet to alert the trainer of the need to go outside. The audible signal from the buzzer (item 11) that would be emitted by the device will be readily recognized as a pet request. The device can be packaged so as to be wall mounted, or configured with an alternating current power supply. The device could also be packaged in such a way as to be incorporated into and become part of other specific training apparatus where a specific action other than the housebreaking activity is solicited. This training device (FIG 1) could be applied anywhere a pet training opportunity exists. These mentioned items and others will be readily apparent on review of the enclosed drawings.

I claim:

1. A portable free standing, pet actuated device for training animals, comprising a pet operated paddle hingedly attached to a mast to operate a switch allowing an electrical current to operate a buzzer that will emit an audible signal when paddle is depressed by animals paw.

2. The invention of claim 1 wherein the paddle is fastened to a mast by a hinged material for the purpose of projecting the paddle from the mast in a position accessible to the pet.

3. The invention of claim 2, wherein the paddle could also be a lever, button, plunger, or other pilot device that could be configured as to allow the pet to actuate with a paw.

4. The invention of claim 1 wherein the audible buzzer is able to respond to the available source of electrical power from the power supply.

5. The invention of claim 1 wherein the buzzer could also be a bell or other audible signaling device capable of responding to the available power supply.

6. The invention of claim 1 wherein the buzzer could be substituted by a light or other illuminating device capable of responding to the electrical current from the power supply for use in training pets by the hearing impaired.

7. The invention of claim 1 wherein the training device is portable and free standing but could also be mounted to a wall or other permanent or temporary structure.

8. The invention of claim 1 wherein the components of the training device shall be mounted in a case for the purpose of assembly.

9. The invention of claim 8 wherein the case could be made in other forms that would allow a more specific training in relationship to the desired act to be learned by the pet as designated by the trainer.

10. The invention of claim 1 wherein the power supply shall be of low voltage of alternating current or direct current as appropriate by the Underwriters Lab where this would be a requirement.

* * * * *